United States Patent
Song (10) Patent No.: US 8,649,816 B2
(45) Date of Patent: Feb. 11, 2014

(54) WIRELESS COMMUNICATION SYSTEM AND METHOD OF OPERATING THE SAME FOR LOW POWER CONSUMPTION OF TERMINAL DEVICE

(75) Inventor: Pyeong Jung Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 228 days.

(21) Appl. No.: 13/328,584

(22) Filed: Dec. 16, 2011

(65) Prior Publication Data
US 2012/0157153 A1   Jun. 21, 2012

(30) Foreign Application Priority Data

Dec. 16, 2010   (KR) ........................ 10-2010-0129477

(51) Int. Cl.
*H04B 7/00*   (2006.01)

(52) U.S. Cl.
USPC .... 455/522; 455/127.1; 455/63.1; 455/67.11; 370/252; 370/318

(58) Field of Classification Search
USPC ........... 455/63.1, 522, 127.1, 13.4, 67.11, 62, 455/436, 423, 425, 435.1, 452.1, 452.2; 370/311, 318, 252
See application file for complete search history.

(56) References Cited

U.S. PATENT DOCUMENTS

| | | | |
|---|---|---|---|
| 2008/0186892 A1 | 8/2008 | Damnjanovic | |
| 2008/0186893 A1 | 8/2008 | Kolding et al. | |
| 2009/0203377 A1* | 8/2009 | Kawasaki | 455/435.1 |
| 2009/0279466 A1 | 11/2009 | Ji et al. | |
| 2009/0305716 A1 | 12/2009 | Ono | |
| 2010/0330921 A1* | 12/2010 | Kim et al. | 455/67.11 |
| 2011/0009116 A1* | 1/2011 | Moberg et al. | 455/425 |
| 2011/0182224 A1* | 7/2011 | Ishii | 370/311 |
| 2011/0217973 A1* | 9/2011 | Sagfors et al. | 455/423 |
| 2012/0088507 A1* | 4/2012 | Legg et al. | 455/436 |
| 2012/0164948 A1* | 6/2012 | Narasimha et al. | 455/63.1 |

* cited by examiner

*Primary Examiner* — Sujatha Sharma
(74) *Attorney, Agent, or Firm* — Staas & Halsey LLP (57) ABSTRACT

The wireless communication system is configured to adaptively change a status report (SR) cycle and a discontinuous reception (DRX) cycle on the basis of a quality of a radio link between a terminal device and a network device. When the quality of the radio link is good, the DRX cycle or the SR cycle is lengthened accordingly, and when the quality of the radio link is poor, the DRX cycle or the SR cycle is shortened accordingly. Furthermore, when the quality of the radio link is good for a long time, the power consumption can be significantly reduced by turning off the terminal device, and after a certain time, turning on the device.

17 Claims, 8 Drawing Sheets

| RLqual Index (RLqual(i)) | Radio-link quality level | DRX-cycle Index (Dcycle(j)) | DRX-cycle value |
|---|---|---|---|
| 0 | RLqual = RLqual(0) | 0 | Dcycle = Dcycle(0) |
| 1 | RLqual(0) < RLqual <= RLqual(10) | 1 | Dcycle(0) < Dcycle <= Dcycle (10) |
| 2 | RLqual(10) < RLqual <= RLqual(12) | 2 | Dcycle(10) < Dcycle <= Dcycle (12) |
| 3 | RLqual(12) < RLqual <= RLqual(14) | 3 | Dcycle(12 < Dcycle <= Dcycle (14) |
| 4 | RLqual(14) < RLqual <= RLqual(17) | 4 | Dcycle(14 < Dcycle <= Dcycle (17) |
| 5 | RLqual(19) < RLqual <= RLqual(21) | 5 | Dcycle(19) < Dcycle <= Dcycle (21) |
| ... | ... | ... | ... |
| m | RLqual <= RLqual (max) | n | Dcycle > Dcycle (max) |

| RLqual Index (RLqual(i)) | Radio-link quality level | SR-cycle Index (Scycle(j)) | DRX-cycle value |
|---|---|---|---|
| 0 | RLqual = RLqual(0) | 0 | Scycle = Dcycle(0) |
| 1 | RLqual(0) < RLqual <= RLqual(10) | 1 | Scycle(0) < Scycle <= Scycle(10) |
| 2 | RLqual(10) < RLqual <= RLqual(12) | 2 | Scycle(10) < Scycle <= Scycle(12) |
| 3 | RLqual(12) < RLqual <= RLqual(14) | 3 | Scycle(12 < Scycle <= Scycle(14) |
| 4 | RLqual(14) < RLqual <= RLqual(17) | 4 | Scycle(14 < Scycle <= Scycle(17) |
| 5 | RLqual(19) < RLqual <= RLqual(21) | 5 | Scycle(19) < Scycle <= Scycle(21) |
| ... | ... | ... | ... |
| m | RLqual <= RLqual (max) | n | Scycle > Scycle (max) |

WIRELESS COMMUNICATION SYSTEM AND METHOD OF OPERATING THE SAME FOR LOW POWER CONSUMPTION OF TERMINAL DEVICE

CLAIM FOR PRIORITY

This application claims priority to Korean Patent Application No. 10-2010-0129477 filed on Dec. 16, 2010 in the Korean Intellectual Property Office (KIPO), the entire contents of which are hereby incorporated by reference.

BACKGROUND

1. Technical Field

Example embodiments of the present invention relate in general to the field of wireless communication systems and methods of operating wireless communication systems, and more specifically, to a terminal device, a network device, and a method of operating a wireless communication system including both for adaptively reducing power consumption of the terminal device.

2. Related Art

Recently, in machine-to-machine (M2M) communication such as Smart Grid including general wireless communications, management and maintenance infrastructures for a terminal device which is used as a machine or sensor should be supported to operate in a reliable and efficient manner.

In most general sensor networks, however, it is difficult for the network to monitor real-time status information of a terminal device. The status information includes, but is not limited to, those indicating whether or not the terminal device is properly connected to a network in a state of on-line connectivity, whether the terminal device is accessible by a server at any time (also referred to as a reachability), whether the battery life of the terminal device is a sufficient, and so on. For this reason, a user is obligated to inform of the status information of the terminal device using separate communication means such as a telephone.

Therefore, it is necessary for a status information monitoring system in a network to predict and prevent any probable problems in the operation of a terminal device before the problems actually occur. To this end, the terminal device should periodically transmit a variety of status information including data information collected by the device itself to a network device. The terminal device need not always be powered on in order to transmit the status information to the network or receive instructions from the network, and thus terminal devices generally have a power saving system that periodically switches power modes, for example, the device periodically enters a low power mode but switches to a maximum power mode whenever power is required.

However, conventional power saving systems depend on a simple way to periodically switch a power mode into a low power mode, so that there is a problem with a lack of adaptability to situational changes.

SUMMARY

Accordingly, example embodiments of the present invention are provided to substantially obviate one or more problems due to limitations and disadvantages of the related art.

Example embodiments of the present invention provide a terminal device and method of operating the terminal device used in a wireless communication system which adaptively changes not only a status report (SR) cycle but also a discontinuous reception (DRX) cycle of the terminal device to reduce a required amount of the power of the terminal device.

Example embodiments of the present invention also provide a network device and method of operating the network device used in a wireless communication system which adaptively changes an SR cycle and a DRX cycle of the terminal to reduce a required amount of the power of the terminal device.

In some example embodiments, a terminal device used in a wireless communication system including at least one network device and at least one terminal device to perform a low-power consuming operation of the terminal device, including: a radio link measuring unit configured to measure a quality of a radio link through which the terminal device is connected to the network device; a power trigger unit configured to control a power on/off operation of the terminal device; a control command receiving unit configured to receive a control command from the network device through the radio link, the control command controlling a discontinuous reception (DRX) cycle and a status report (SR) cycle; an SR transmitting unit configured to transmit an SR to the network device through the radio link, the SR including information related to the quality of the radio link measured by the radio link measuring unit; and a control unit configured to transmit the SR including the information related to the quality of the radio link measured by the radio link measuring unit to the network device through the SR transmitting unit, control the DRX cycle and the SR cycle of the terminal device on the basis of the DRX cycle and the SR cycle which are included in the control command received by the control command receiving unit, and control power of the terminal device by means of the power trigger unit when the quality of the radio link measured by the radio link measuring unit satisfies a predetermined condition.

In the embodiment, the quality of the radio link may be indicated by one of a reference signal received power (RSRP), a reference signal received quality (RSRQ), a received signal strength indicator (RSSI), a primary synchronization channel (PSC), a secondary synchronization channel (SSC), and a channel quality indicator (CQI), or by a combination of at least two thereof.

In the embodiment, the control unit may be configured to control the power trigger unit to turn off the terminal device when the quality of the radio link measured by radio link measuring unit is maintained at a level above a predetermined quality for a certain duration. Here, the power trigger unit may be configured to initiate a predetermined timer immediately after the terminal device is turned off, and turns on the terminal device when the timer has expired.

In other example embodiments, a method of operating a terminal device used in a wireless communication system including at least one network device and at least one terminal device to perform a low-power consuming operation of the terminal device, including: measuring a quality of a radio link through which the terminal device is connected to the network device; determining to which of a normal condition, a power-off condition, and a radio link disconnected condition the measured quality of the radio link corresponds; when the measured quality of the radio link corresponds to the status satisfying the normal condition, measuring the quality of the radio link, transmitting a status report (SR) with information related to the quality of the radio link to the network device according to current SR and discontinuous reception (DRX) cycles, receiving a control command including new SR and DRX cycles which correspond to the information related to the quality of the radio link from the network device, and changing the SR and DRX cycles on the basis of the received control command; when the measured quality of the radio link corresponds to the status satisfying the power-off condition, measuring the quality of the radio link, transmitting an SR indicating that the terminal device is in the power-off state to the network device as long as the quality of the radio link is maintained at a level above a predetermined threshold value for a certain time period, and turning off the terminal device; and when the measured quality of the radio link corresponds to the status satisfying the radio link disconnected condition, causing other neighboring terminal devices to transmit an SR of the terminal device having the disconnected state to the network device.

In the embodiment, turning off the terminal device may include initiating a predetermined timer immediately after the terminal device is turned off, and powering on the terminal device when the timer has.

In the embodiment, the status satisfying the power-off condition may correspond to the case that the measured quality of the radio link is maintained at a level above a predetermined threshold value for a certain time period.

In still other example embodiments, a network device used in a wireless communication system including at least one network device and at least one terminal device to perform a low-power consuming operation of the terminal device, including: a status report (SR) receiving unit configured to receive an SR from the terminal device through a radio link, the SR including information related to a quality of the radio link; a control unit configured to determine a discontinuous reception (DRX) cycle and an SR cycle of the terminal device on the basis of the information related to the quality of the radio link which is included in the SR received by the SR receiving unit, and generate a control command including information related to the determined cycles; and a control command transmitting unit configured to transmit the control command which is generated by the control unit to the terminal device through the radio link.

In the embodiment, the quality of the radio link may be indicated by one of an RSRP, an RSRQ, an RSSI, a PSC, an SSC, and a CQI, or by a combination of at least two thereof.

In the embodiment, if the quality of the radio link is good, the control unit may determine to lengthen the DRX cycle or the SR cycle accordingly, and if the quality of the radio link is poor, the control unit may determine to shorten the DRX cycle or the SR cycle accordingly, on the basis of the information related to the quality of the radio link.

In the embodiment, the SR receiving unit may be configured to receive an additional SR indicating that the terminal device is turned on and notify the control unit of the SR; and the control unit, upon receiving the notification of the additional SR, may transmit a control command from the control command transmitting unit to the terminal device a predetermined number of times, the control command instructing to report a current status of the terminal device.

In yet other example embodiments, a method of operating a network device used in a wireless communication system including at least one network device and at least one terminal device to perform a low-power consuming operation of the terminal device, including: receiving a status report (SR) from the terminal device; determining to which of an SR with information related to a quality of a radio link of the terminal device transmitting the SR, an SR indicating a current status by another terminal device in place of the terminal device, or an SR indicating that the terminal device is turned on the SR corresponds; if the SR corresponds to an SR including the information related to a quality of a radio link of the terminal device transmitting the SR, determining a discontinuous reception (DRX) cycle and an SR cycle of the terminal device, and transmitting a control command including information related to the determined DRX and SR cycles to the terminal device, on the basis of the quality of the radio link; and if the SR corresponds to an SR that another terminal device other than the terminal device informs a current status or an SR indicating that the terminal device is turned on, transmitting a control command that instructs the network device to report a current status to the terminal device a predetermined number of times.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "terminal device" is used herein to refer to a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, mobile, or the like. A variety of examples of the terminal device include not only a cellular phone, a smart phone with a wireless communication capability, a personal digital assistant (PDA) with a wireless communication capability, a wireless modem, a portable computer with a wireless communication capability, an imaging device such as a digital camera with a wireless communication capability, a gaming apparatus with a wireless communication capability, home appliances capable of storing and playing a music with a wireless communication capability, internet equipments capable of a wireless internet access and browsing, but also portable units or terminals incorporating combinations of the above capabilities, and examples are not limited thereto.

The term "base station" is used herein to refer to a fixed or moving station which can be in communication with a terminal device and may also be referred to as a wireless communication station, Node-B, eNode-B, a base transceiver system (BTS), an access point, a relay, a femto-cell, and so on.

Hereinafter, specific embodiments of the present invention will be described in detail with reference to the accompanying drawings.

Figure 1:
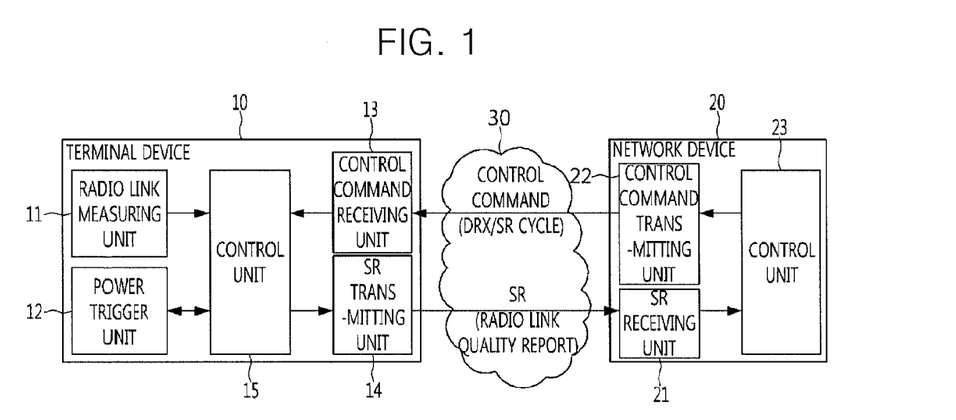
FIG. 1 is a conceptual diagram illustrating a wireless communication system employing a method of reducing the power consumption of a terminal device in accordance with the present invention.

FIG. 1 is a conceptual diagram illustrating a wireless communication system employing a method of reducing the power consumption of a terminal device in accordance with the present invention.

Referring to FIG. 1, a wireless communication system includes a terminal device 10 (hereinafter also referred or as "device" or "terminal"), and a network device 20.

The terminal device 10 includes a radio link measuring unit 11, a power trigger unit 12, a control command receiving unit 13, a status report (SR) transmitting unit 14, and a control unit 15. The radio link measuring unit 11 is configured to measure a quality of a radio link 30 through which the terminal device is connected to the network device 20. The power trigger unit 12 is configured to control power on/off of the terminal device. The control command receiving unit 13 is configured to receive a control command from the network device through the radio link, the control command is for controlling a discontinuous reception (DRX) cycle and an SR cycle. The SR transmitting unit 14 is configured to transmit an SR to the network device through the radio link, and the SR contains information related to the quality of the radio link measured by the radio link measuring unit. The control unit 15 is configured to instruct the SR transmitting unit 14 to transmit an SR to the network device 20, control a DRX cycle and an SR cycle of the terminal device on the basis of the DRX cycle and the SR cycle included in the control command received by the control command receiving unit 13, and control a power of the terminal device through the power trigger unit 12 when the quality measured by the radio link measuring unit 11 corresponds to a predetermined condition. The SR contains the information related to the quality of the radio link measured by the radio link measuring unit 11.

The network device 20 generally refers to a base station which provides services to the terminal devices over the radio link and controls the terminal devices. However, the network device may be construed to include any components performing the above described functions in addition to the base station when functional components which will be described later are distributed The network device 20 includes an SR receiving unit 21, a control unit 23, and a control command transmitting unit 22. The SR receiving unit 21 is configured to receive an SR through the radio link 30 from the terminal device 10. The control unit 23 is configured to determine the quality of the radio link 30 between the terminal device and the network device on the basis of the SR received at the SR receiving unit 21, and generate a control command which changes the DRX cycle and the SR cycle according to the determined results. The control command transmitting unit 22 is configured to transmit the control command to the terminal device 10 through the radio link in response to an instruction of the control unit.

Figure 2:
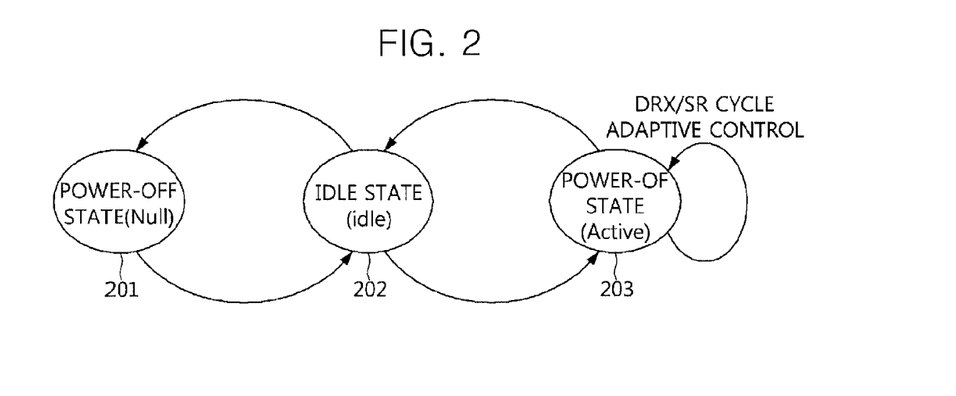
FIG. 2 is a diagram illustrating state transitions of a terminal device in accordance with an embodiment of the present invention.

FIG. 2 is a diagram illustrating state transitions of a terminal device in accordance with an embodiment of the present invention.

Referring to FIG. 2, a status of the terminal device according to the embodiment can be generally classified as a null state 201, an idle state 202, or an active state. The null state is a power mode where the terminal device is turned off, and the active state is a power mode where a general communication is performed.

The terminal device is typically changed from the idle state 202 to the null state 201 at which the power is turned off automatically under a predetermined condition. The null state is a power mode having the same effects as being a shutdown by a user.

The active state 203 of the terminal device is a power mode in which general communication is performed. In this mode the DRX cycle and the SR cycle may be changed These three states can be implemented in conjunction with each other.

Figure 3:
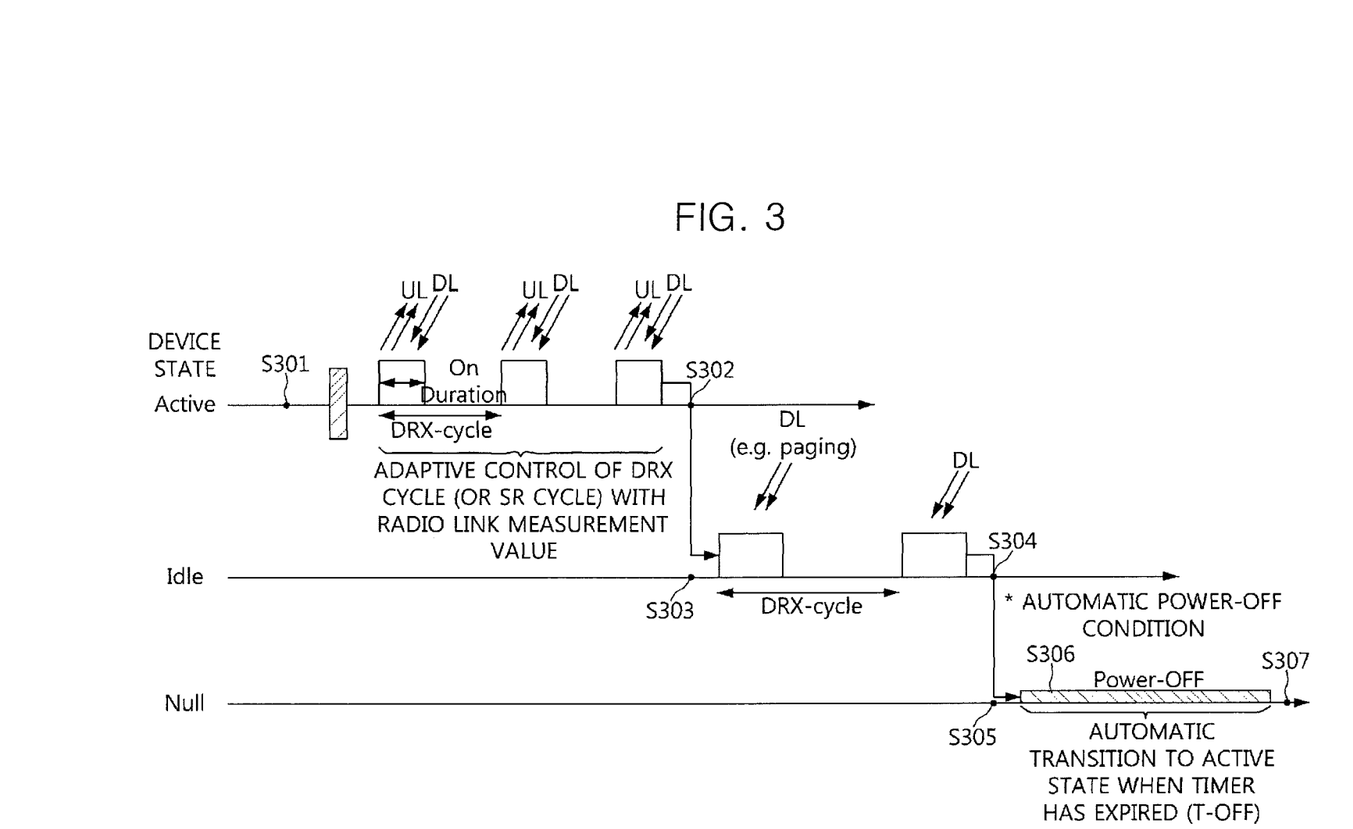
FIG. 3 is a conceptual diagram for explaining each detailed operation of state transitions of a terminal device in accordance with an embodiment of the present invention.

FIG. 3 is a conceptual diagram for explaining each detailed operation of state transitions of a terminal device in accordance with an embodiment of the present invention.

Referring to FIG. 3, the situation in which the status of the terminal device is sequentially transited into the active state, the idle state, and the null state is illustrated. That is, the y-axis of the FIG. 3 denotes the status of the terminal device and the x-axis denotes the time. Hereinafter, detailed operations of the terminal device will be described in the order of the time durations S301 to S306.

Durations S301 to S302: In the terminal device in the active state, the DRX cycle and the SR cycle are adaptively controlled on the basis of the quality measurement value of the radio link. The DRX cycle is repeatedly performed at two periods, an active duration (On Duration) and a sleeping duration (Opportunity DRX). The signals can be received and transmitted only in the active duration. In this period, the quality measurement value of the radio link is sent from the SR transmitting unit 14 of the terminal device to the network device in an uplink signal (UL) transmission. The signal (e.g., control command) from the network device is transmitted to the control command receiving unit 13 in a downlink signal (DL) transmission.

It will be described later how the DRX cycle and the SR cycle of the terminal device in the active state are adaptively controlled on the basis of the quality measurement value of the radio link.

Durations S303 to S305: When the communication process of the terminal device in the active state is completed, the terminal device enters and remains in the idle state (S303). In this process, if the terminal device receives a message such as a paging, the terminal device is transited to the active state to answer the paging. At this time, if the quality measurement value of the radio link is maintained at a level above a predetermined threshold value TH (pwr_off) for a certain time period TH (time_off), the terminal device is transited from the idle state to the null state (S305). That is, this transition is a process of turning off the terminal device when the quality of the radio link is good for a long time (or a case predicted to be satisfactory). This process has a similar effect to when the DRX cycle and the SR cycle have very long periods. The parameters TH (time_off) and TH (pwr_off) are determined by the statistics of an operator of the wireless communication system.

Durations S306 to S307: If the timer power off (T-OFF) has expired, the terminal device in the null state (S306) is transited to the active state automatically (S307) and reenters the active state (S301) as described above.

Figure 4:
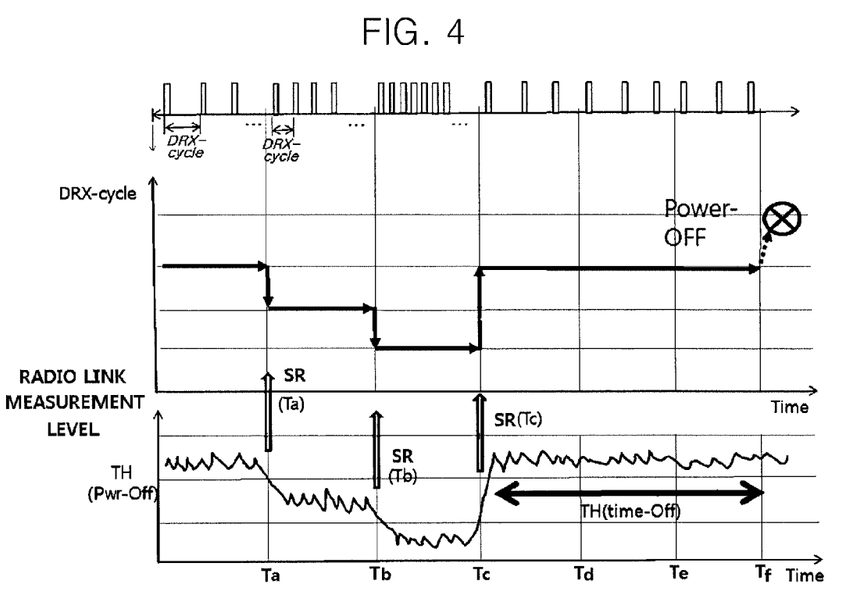
FIG. 4 is a conceptual diagram for explaining the operations over time of a DRX cycle which can be changed depending on the quality measurement results of a radio link in an active state of a terminal device in accordance with an embodiment of the present invention.

FIG. 4 is a conceptual diagram for explaining the operations over time of a DRX cycle that can be changed depending on the quality measurement results of a radio link in an active state of a terminal device in accordance with an embodiment of the present invention.

Referring to FIG. 4, the higher the level of quality measurement value of the radio link is, the longer the DRX cycle is. The lower the level of the quality measurement value of the radio link is the shorter the DRX cycle is. With this relationship between the DRX cycle and the quality level, if the condition of the radio link is good, the DRX cycle takes longer to achieve a more stable operation of the terminal device accordingly. If the condition of the radio link is poor, the DRX takes shorter, so that it is necessary to frequently monitor the reception of the SR.

Specifically, FIG. 4 illustrates situations that the DRX cycle is changed when the level of the quality measurement value of the radio link in the times Ta, Tb, and Tc goes above or below the threshold values of each stages. Meanwhile, in the period from the time Tc to the time Tf, if the level of the quality measurement value of the radio link is maintained at the level above a predetermined threshold value TH (pwr_off) for a certain time period TH (time_off), the terminal device is transited to a power-off state (null state) automatically. These processes correspond to those of the durations S303 to S305 described with reference to FIG. 3.

Therefore, in order to adaptively control the DRX cycle according to the embodiment, it may be necessary to accurately calculate the quality measurement value of the radio link in the radio link measuring unit 11 of the terminal device 10 as described with reference to FIG. 1.

Figure 5:
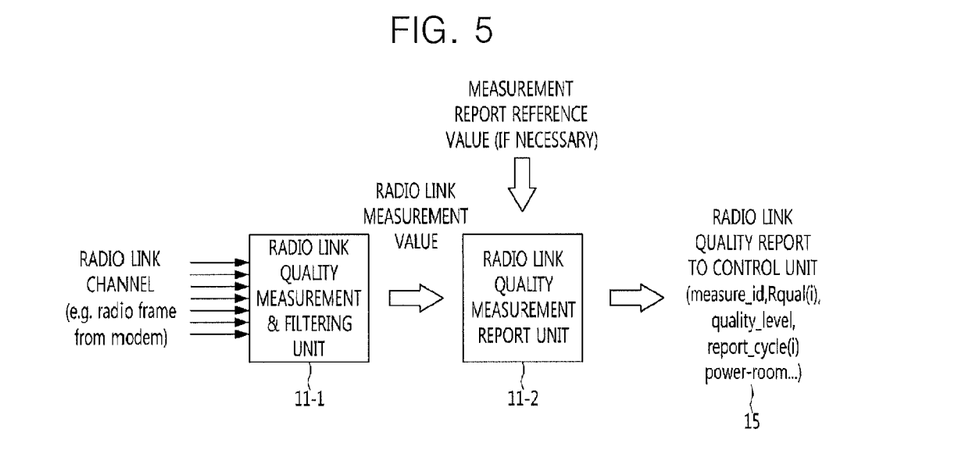
FIG. 5 is a block diagram for explaining an exemplary configuration of a radio link measuring unit of a terminal device in accordance with an embodiment of the present invention.

FIG. 5 is a block diagram for explaining an exemplary configuration of a radio link measuring unit of a terminal device in accordance with an embodiment of the present invention.

Referring to FIG. 5, the radio link measuring unit 11 may include a radio link quality measurement and filtering unit 11-1, and a radio link quality measurement value report unit 11-2.

The radio link measuring unit may receive a radio frame sequence on the radio link, filter any noise included in the radio frame sequence, and provide an average value calculated for a certain time period (e.g., dozens to hundreds of milliseconds) as a measurement value of the radio link. The radio link measuring unit also may compare the average value with a measurement reporting reference value transmitted from the network device, and transmit a radio link quality report to the control unit when the compared value satisfies a predetermined condition. The control unit 15 may generate an SR on the basis of the radio link quality report and transmit the SR to the network device 20 through the SR transmitting unit 14.

The radio link quality report can include a radio link quality measurement type (measure_id), a radio link measurement value (RLqual), a reporting time (report_time), a reporting cycle (report_cycle), a power residual amount (power_room), and so on.

The radio link measurement value (RLqual) may be used as a reference signal received power (RSRP), a reference signal received quality (RSRQ), a received signal strength indicator (RSSI), a primary synchronization channel (PSC), a secondary synchronization channel (SSC), a channel quality indicator (CQI), or a combination thereof. The radio link measuring unit generates a radio link quality report including some related parameters and some of such measurement values.

Figure 6:
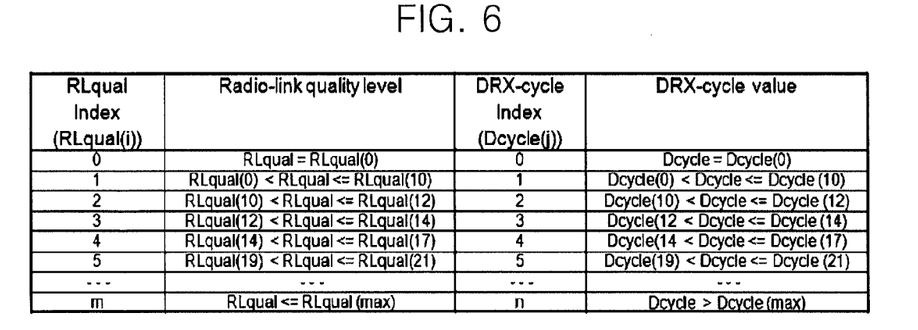
FIG. 6 is a mapping table for explaining a mapping concept between a DRX cycle which can be changed depending on the quality measurement results of a radio link and a quality measurement value of the radio link in accordance with an embodiment of the present invention.

FIG. 6 is a mapping table for explaining a mapping concept between a DRX cycle which can be changed depending on the quality measurement results of a radio link and a quality measurement value of the radio link in accordance with an embodiment of the present invention.

Referring to FIG. 6, the determination of to which of several predetermined durations the radio link quality measurement (RLqual) by the radio link measuring corresponds, and the mapping relationship between the DRX cycle and the radio link quality measurement, with the DRX cycle corresponding to each duration, are explained. However, it is unnecessary for the mapping of the radio link quality measurement and the DRX cycle to be always implemented using such a mapping table. It may be possible to perform the calculation with a predetermined formula using the relationship between the radio link quality measurement and the DRX cycle.

Figure 7:
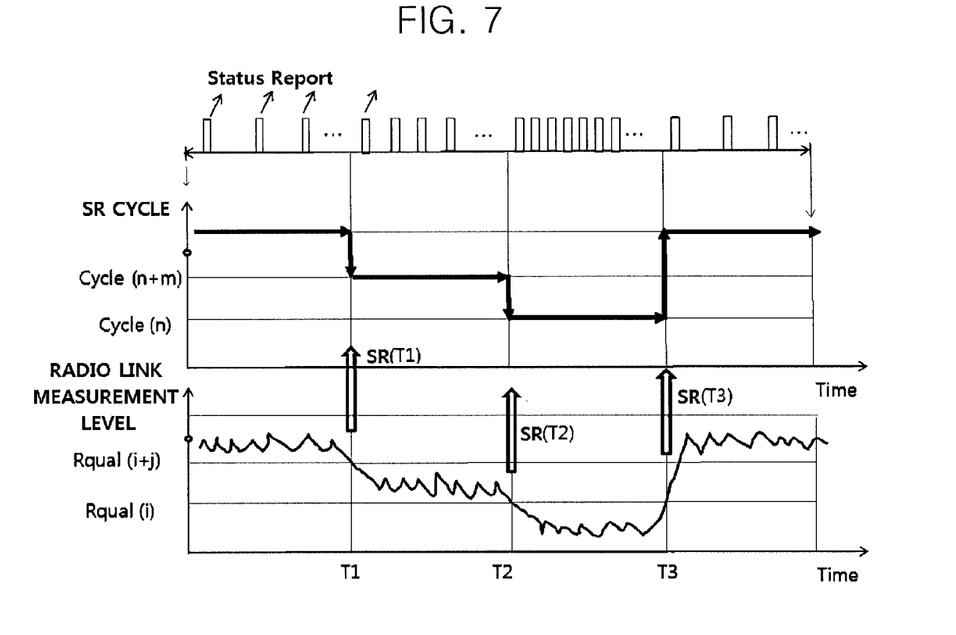
FIG. 7 is a conceptual diagram for explaining the operations over time of an SR cycle which can be changed depending on the quality measurement results of a radio link in an active state of a terminal device in accordance with an embodiment of the present invention.

FIG. 7 is a conceptual diagram for explaining the operations over time of an SR cycle that can be changed depending on the quality measurement results of a radio link in an active state of a terminal device in accordance with an embodiment of the present invention.

Referring to FIG. 7, the higher the level of the quality measurement value of the radio link is, the longer the SR cycle is. The lower the level of quality measurement value of the radio link is, the shorter the SR cycle is.

The status information of the terminal device is periodically transmitted to the network device 20 through the SR transmitting unit 14. The basic operation principle is similar to the transition concept of the DRX cycle described with reference to FIG. 4, so the detailed explanation will be omitted.

Figure 8:
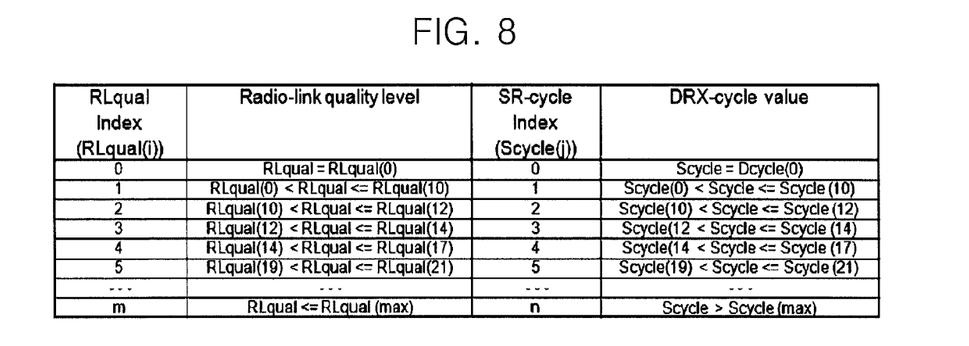
FIG. 8 is a mapping table for explaining a mapping concept between an SR cycle which can be changed depending on the quality measurement results of a radio link and a quality measurement value of the radio link in accordance with an embodiment of the present invention.

FIG. 8 is a mapping table for explaining a mapping concept between an SR cycle that can be changed depending on the quality measurement results of a radio link and a quality measurement value of the radio link in accordance with an embodiment of the present invention.

Referring to FIG. 8, determination of to which of several predetermined durations the radio link quality measurement (RLqual) by the radio link measuring unit corresponds, and the mapping relationship between the SR cycle and the radio link quality measurement, with the RS cycle corresponding to each durations, are explained. However, it is unnecessary for the mapping of the radio link quality measurement and the SR cycle to be always implemented using such a mapping table. It may be possible to perform the calculation with a predetermined formula using the relationship between the radio link quality measurement and the SR cycle.

Figure 9:
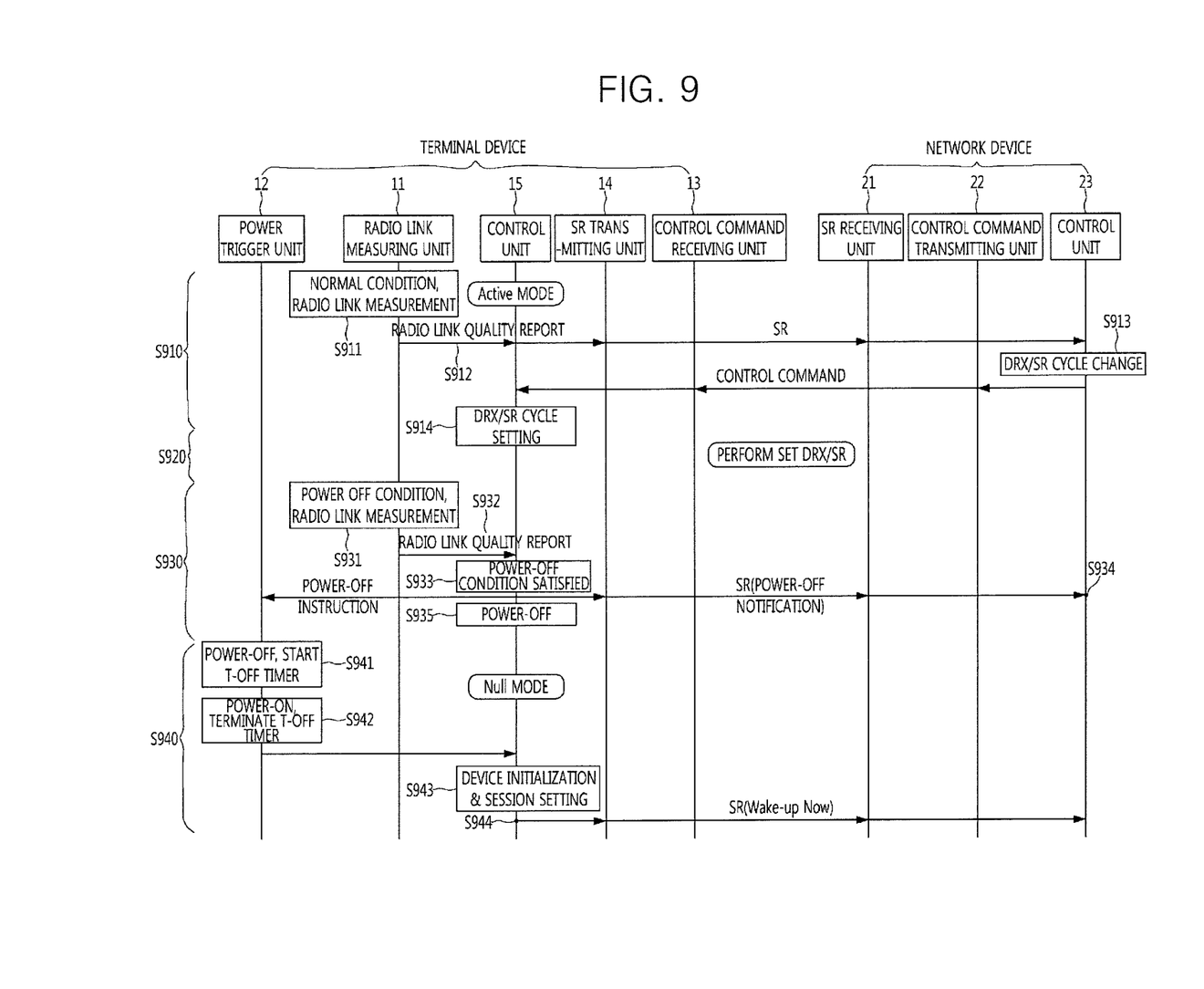
FIG. 9 is a sequence chart for explaining an operation of a wireless communication system in accordance with an embodiment of the present invention.

FIG. 9 is a sequence chart for explaining an operation of a wireless communication system in accordance with an embodiment of the present invention.

Referring to FIG. 9, it is shown that an operation process of the wireless communication system is explained as a process that associates internal components of a terminal device with internal components of a network, when the terminal device transits from an active state to an idle state, from the idle state to a null state, and then from the null state to the active state.

Operations S910 (S911 to S914): These operations are a control process for adaptive change of the "DRX cycle" or the "SR cycle," when a radio link quality of the terminal device in the active state is not good but not poor. When the radio link measuring unit 11 measures a quality of the radio link (RL Quality Report) and transmits it to the control unit 15, the control unit 15 transmits an SR including the measurement results to the network device 20 through the SR transmitting unit 14 (S912).

In the network device 20, the SR receiving unit 21 receives the SR transmitted from the terminal device, and the control unit 23 determines a new DRX cycle and SR cycle using the quality measurement results of the radio link in response to the received the SR (S913). The control command transmitting unit 22 transmits a control command including the determined DRX/SR cycle to the terminal device. The control unit 15 of the terminal device sets the DRX/SR cycle included in the received control command as a current DRX/SR cycle (S914).

Operation S920: The terminal device and the network device perform a process to report the operation and status of the DRX cycle using the newly set cycle values (DRX cycle and SR cycle).

Operations S930 (S931 to S935): These operations are the process by which the terminal device in the active state completes the communication process and enters the idle state, and then the terminal device is turned off when the quality of the radio link is good. This process has a similar effect to when the DRX cycle and the SR cycle have very long periods.

On the other hand, in the idle state, the quality measurement of the radio link uses a specific downlink channel to be adapted to the purpose of the present invention. If the specific downlink channel is not available, the quality measurement of the radio link can use an existing downlink channel. When an uplink channel is not available, the terminal device may find other available neighboring terminal devices, and request a signal forwarding so that the other terminal device will transmit the SR to the network using a terminal to terminal communication method in the near field communication network.

When the radio link measuring unit 11 measures the quality of the radio link (S931) and transmits the measured value (S932) while the measured value still maintains a level above a predetermined threshold value TH (pwr_off) for a certain duration of time TH (time_off) (S933), the control unit 15 instructs the SR transmitting unit 14 to report the SR to the network device (S934), and thus the network device recognizes that the control unit is to be transited to a "Power-OFF" state. At this time, the process proceeds to the "Power-OFF" state at the same time that a Power-OFF timer (T-OFF timer) is initiated (S935).

Operations S940 (S941 to S944): The process proceeds to the "Power-OFF" state (S935), and at the same time, the Power-OFF timer (T-OFF timer) begins counting by the power trigger unit 12 (S941). When the timer (T-OFF) has expired (S942), the process proceeds to a session setting operation for sending the SR signal to the network at the same time that the terminal device is initialized by compulsorily turning on the terminal device. The terminal device performs the device initialization and the session setting and reports that the terminal device has just woken up from the "Power-OFF" state through the SR (Wake-up NOW) to the network (S944).

Additionally, while the terminal device is in the Power-OFF state, to prevent the terminal device from being damaged, the network device may be configured to transmit a control command in which the terminal device is instructed to perform a current SR immediately after receiving the SR (Wake-up NOW, 619). Herein, the control command may repeatedly transmit the control command a predetermined number of times (e.g., three times). If the terminal device has no reply for such repetitive transmissions of the control command, the network device determines that the terminal device has been damaged during the Power-OFF state, and thus it is necessary to check the status of the terminal and perform a maintenance behavior such as a dispatching of an operator. If the terminal device has replied, the network device regards the terminal device as having returned to the normal state.

Figure 10:
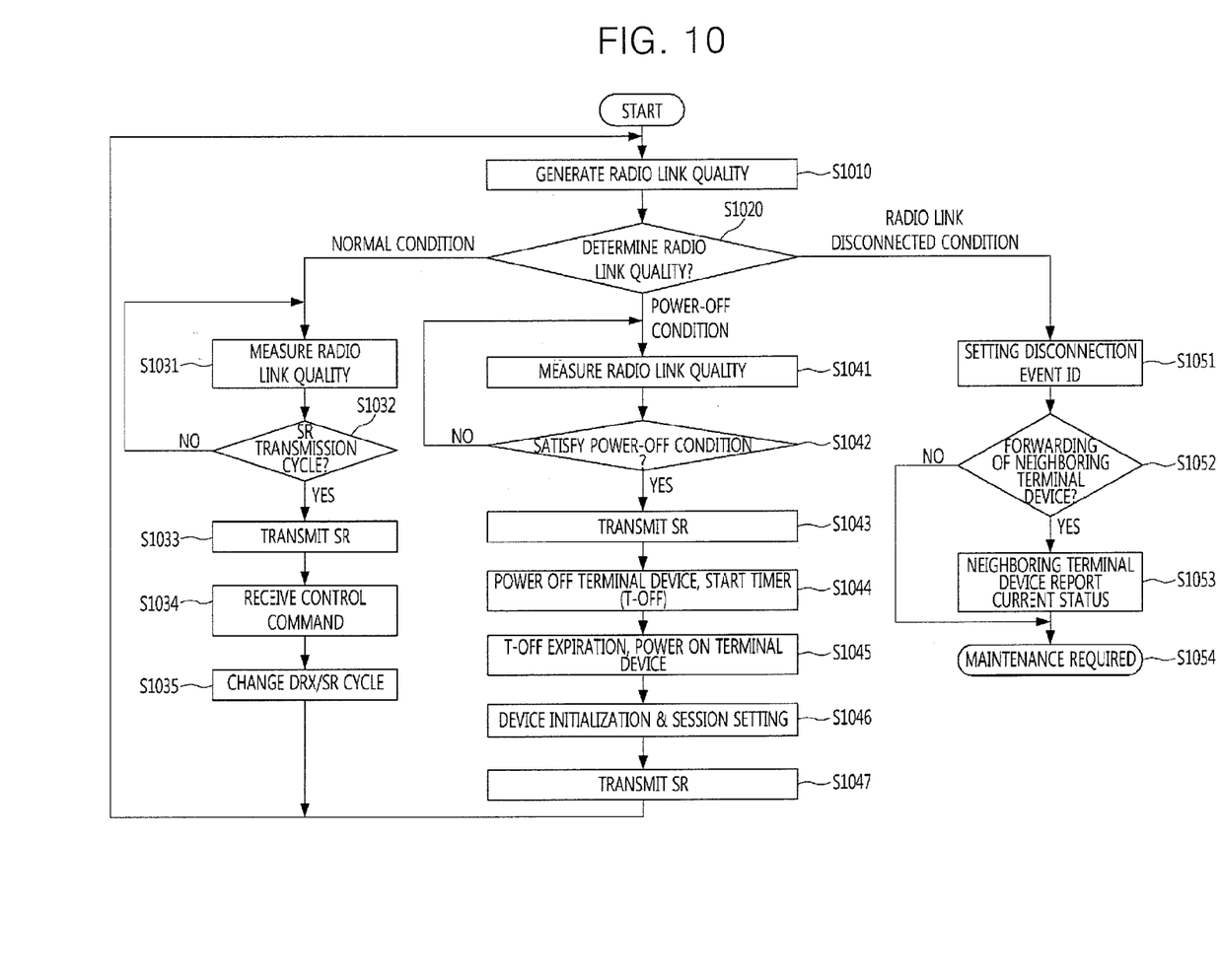
FIG. 10 is a flow chart for explaining a method of operating a terminal device in a wireless communication system employing a method of reducing the power consumption of the terminal device in accordance with an embodiment of the present invention.

FIG. 10 is a flow chart for explaining a method of operating a terminal device in a wireless communication system employing a method of reducing the power consumption of the terminal device in accordance with an embodiment of the present invention.

Referring to FIG. 10, the operation method of the terminal device according to the present invention includes: measuring a quality of a radio link through which the terminal device is connected to the network device (S1010); determining to which of a normal condition satisfying state, a power-off condition satisfying state, and a radio link disconnected state the quality measurement value of the radio link corresponds (S1020); when the quality measurement value of the radio link corresponds to the normal condition satisfying state, measuring the quality of the radio link, transmitting an SR including information related to the radio link quality to the network device according to current SR and DRX cycles, receiving a control command including new SR and DRX cycles which correspond to the information related to the radio link quality from the network device, and changing the SR and DRX cycles on the basis of the received control command (S1031 to S1035); when the quality measurement value of the radio link is the power-off condition satisfying state, measuring the quality of the radio link, transmitting an SR indicating that the terminal device is in the power-off state when the quality measurement value of the radio link is maintained at a level above a predetermined threshold value for a certain time period, and causing the terminal device to turn off the power (S1041 to S1044); and when the quality measurement value of the radio link is the radio link disconnected condition, causing other neighboring terminal devices to transmit an SR of the terminal device having the disconnected state to the network device (S1051 to S1054).

Operation S1010 is performed to measure the quality of the radio link in the radio link measuring unit 11 as explained in reference to FIG. 5. In this operation, an indication showing the quality of the radio link can be used by a variety of measurement values and any combination of thereof, as described above.

In operation S1020, it is determined to which of a normal condition, a power off condition, and a radio link disconnected condition the quality measurement value of the radio link corresponds. At this time, when the status satisfies the normal condition, the quality of the radio link corresponds to a normal state. When the status satisfies the power off condition, the quality of the radio link is maintained at a more satisfactory and stable state than the normal condition. In other words, the status indicates that the terminal device is turned off to achieve the same effects as very long DRX and SR cycles. The radio link disconnected condition indicates a radio link failure state in which data is not receive or transmit normally due to a poor quality of the radio link.

Operations S1031 to S1035 are performed when the quality measurement value of the radio link corresponds to the status satisfying the normal condition. The terminal device continuously monitors the quality of the radio link (S1031), determines whether an SR cycle has started (S1032), if a the SR cycle has started, transmits an SR including information related to the radio link quality to the network device (S1033), subsequently receives a control command including new SR and DRX cycles which correspond to the information related to the radio link quality from the network device (S1034), and transits the SR and DRX cycles on the basis of the received control command (S1035).

Operations S1041 to S1044 are performed when the quality measurement value of the radio link corresponds to the status satisfying the power-off condition. The terminal device continuously measures the quality of the radio link (S1041), and determines whether the power off condition is satisfied (S1042). At this time, the power off condition may indicate the status in which the quality of the radio link is maintained at a level above a predetermined value for a certain time period. Next, if an SR cycle has begun, the terminal device informs to the network device that the power off state will begin (S1043), turns off the power, and initiates a power off timer (T_OFF timer) (S1044).

On the other hand, operations S1045 to S1047 show that the terminal device, which has turned off the power, returns to the power on state. After operation S1044, the terminal device goes to the null state. Then, if the T_OFF timer which was set in operation S1045 has expired, the terminal device is automatically turned on (by the power trigger unit). The terminal device performs a device initialization and session setup (S1046) and informs the network device that the terminal device is powered on (S1047).

Operations S1051 to S1054 are performed when the quality measurement value of the radio link corresponds to the status satisfying the radio link disconnected condition. The terminal device sets an event identification informing of the radio link disconnected condition (S1051), and decides whether another neighboring terminal device can forward the message in place of the terminal device having the disconnected condition (S1051). If possible, the other neighboring terminal device transmits a current SR to the network device, and then awaits any necessary maintenance (S1054).

Figure 11:
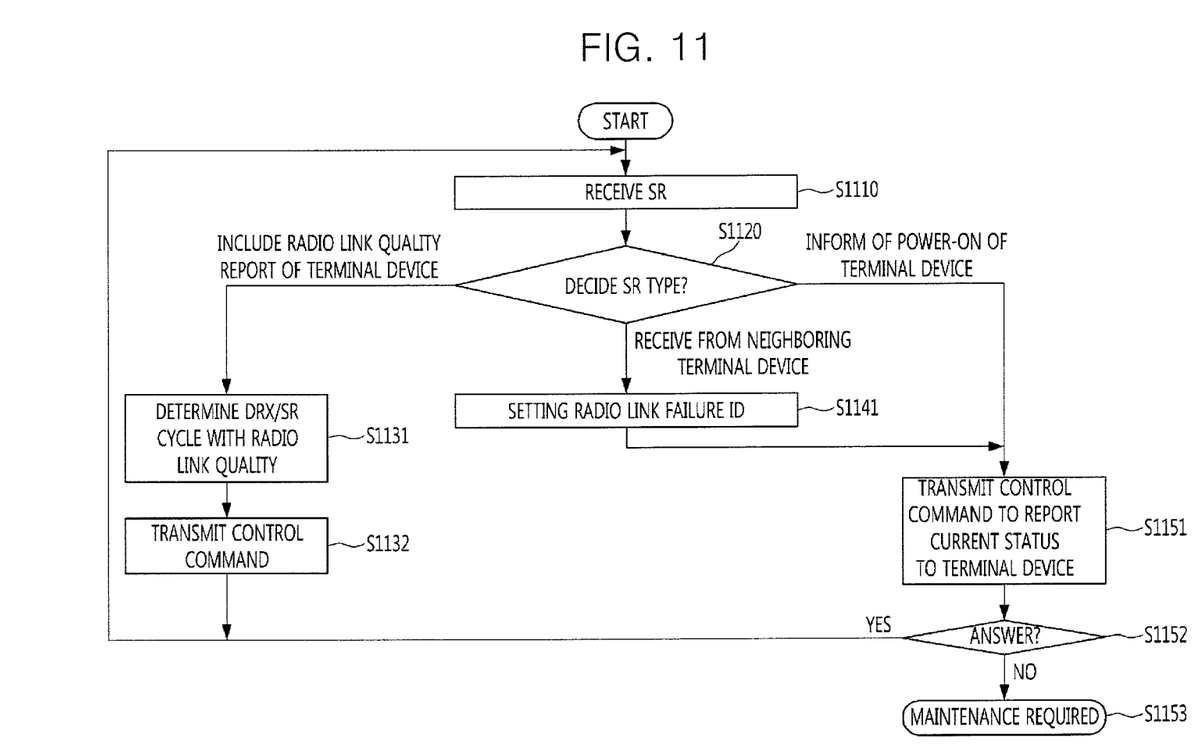
FIG. 11 is a flow chart for explaining a method of operating a network device in a wireless communication system employing a method of reducing the power consumption of a terminal device in accordance with an embodiment of the present invention.

FIG. 11 is a flow chart for explaining a method of operating a network device in a wireless communication system employing a method of reducing the power consumption of a terminal device in accordance with an embodiment of the present invention.

Referring to FIG. 11, a method of operating a network device according to the present invention includes: receiving an SR from the terminal device (S1110); determining to which of an SR with information related to a quality of a radio link of the terminal device transmitting the SR, an SR that another terminal device has reported a current status in place of the terminal device, or an SR indicating that the terminal device is turned on the SR corresponds (S1120); if the SR corresponds to an SR including the information related to a quality of a radio link of the terminal device transmitting the SR, determining a DRX cycle and an SR cycle of the terminal device, and transmitting a control command including information related to the determined DRX and SR cycles to the terminal device on the basis of the quality of the radio link (S1131, S1132); and if the SR corresponds to an SR that another terminal device has reported a current status in place of the terminal device or an SR indicating that the terminal device is turned on, transmitting a control command that instructs the network device to report a current status to the terminal device a predetermined number of times (S1151 to S1153).

In operation S1110, the network device receives the SR from the terminal device. At this time, this operation may be classified according to three situations on the basis of the information included in the SR transmitted from the terminal device, as follows: the network device is receiving the information related to the quality of the radio link connected to the terminal device which has transmitted the SR (e.g., S912 in FIG. 9), the network device is receiving the SR by another terminal device in place of the terminal device which has not transmitted the SR (e.g., S1053 in FIG. 10), or the network device is receiving the SR indicating that the terminal device is turned on (e.g., S944 in FIG. 9).

Therefore, it is determined to which of three situations the received SR corresponds in operation S1120.

Operations S1131 to S1132 are performed when the received SR includes the information related to the quality of the radio link connected to the terminal device which has transmitted the SR. The network device decides a DRX cycle and an SR cycle on the basis of the quality of the radio link included in the SR (S1131), and transmits a control command including the decided DRX and SR cycles to the terminal device (S1132).

Operations S1151 to S1153 are performed when the received SR includes the information informing that the terminal device is turned on. The network device transmit a control command to the terminal device and awaits a response (S1151) The control command instructs the terminal device to transmit a current SR of the terminal device. Then, the network device decides whether the terminal device has responded (S1152). If the network device has received a response from the terminal device, operation S1110 of receiving the SR is performed normally. If the network device has not received a response from the terminal device, the network device decides that maintenance is necessary for the terminal device (S1153).

On the other hand, when it is determined that the SR which is received in operation S1120 is as SR from another terminal device in place of the terminal device which has transmitted the SR, operation S1151 is performed. In this case, there is a difference in that the network continuously transmits a control command to the other terminal device in place of the terminal device which has not transmitted the SR a predetermined number of times. The control command instructs the other terminal device to transmit a current SR.

The methods of operating the terminal device and network device according to the present invention enable the DRX cycle and SR cycle of the device to be adaptively controlled in response to a quality level of a communication environment, so that methods of controlling power of the device and the transmission frequency of status information may be improved, resulting in reduction of the required power of the device.

While the example embodiments of the present invention and their advantages have been described in detail, it should be understood that various changes, substitutions and alterations may be made herein without departing from the scope of the invention.

What is claimed is:

1. A terminal device used in a wireless communication system including at least one network device and at least one terminal device to perform a low-power consuming operation of the terminal device, comprising:
   a radio link measuring unit configured to measure a quality of a radio link through which the terminal device is connected to the network device;
   a power trigger unit configured to control a power on/off operation of the terminal device;
   a control command receiving unit configured to receive a control command from the network device through the radio link, the control command controlling a discontinuous reception (DRX) cycle and a status report (SR) cycle;
   an SR transmitting unit configured to transmit an SR to the network device through the radio link, the SR including information related to the quality of the radio link measured by the radio link measuring unit; and
   a control unit configured to transmit the SR including the information related to the quality of the radio link measured by the radio link measuring unit to the network device through the SR transmitting unit, control the DRX cycle and the SR cycle of the terminal device on the basis of the DRX cycle and the SR cycle which are included in the control command received by the control command receiving unit, and control power of the terminal device by means of the power trigger unit when the quality of the radio link measured by the radio link measuring unit satisfies a predetermined condition.

2. The terminal device of claim 1, wherein the quality of the radio link is indicated by one of a reference signal received power (RSRP), a reference signal received quality (RSRQ), a received signal strength indicator (RSSI), a primary synchronization channel (PSC), a secondary synchronization channel (SSC), and a channel quality indicator (CQI), or by a combination of at least two thereof.

3. The terminal device of claim 1, wherein the control unit controls the power trigger unit to turn off the terminal device when the quality of the radio link measured by radio link measuring unit is maintained at a level above a predetermined quality for a certain time period.

4. The terminal device of claim 3, wherein the power trigger unit initiates a predetermined timer immediately after the terminal device is turned off, and turns on the terminal device when the timer has expired.

5. A network device used in a wireless communication system including at least one network device and at least one terminal device to perform a low-power consuming operation of the terminal device, comprising:
   a status report (SR) receiving unit configured to receive an SR from the terminal device through a radio link, the SR including information related to a quality of the radio link;
   a control unit configured to determine a discontinuous reception (DRX) cycle and an SR cycle of the terminal device on the basis of the information related to the quality of the radio link which is included in the SR received by the SR receiving unit, and generate a control command including information related to the determined cycles; and
   a control command transmitting unit configured to transmit the control command which is generated by the control unit to the terminal device through the radio link.

6. The network device of claim 5, wherein the quality of the radio link is indicated by one of a reference signal received power (RSRP), a reference signal received quality (RSRQ), a received signal strength indicator (RSSI), a primary synchronization channel (PSC), a secondary synchronization channel (SSC), and a channel quality indicator (CQI), or by a combination of at least two thereof.

7. The network device of claim 6, wherein if the quality of the radio link is good, the control unit determines to lengthen the DRX cycle accordingly, and if the quality of the radio link is poor, the control unit determines to shorten the DRX cycle accordingly, on the basis of the information related to the quality of the radio link.

8. The network device of claim 6, wherein if the quality of the radio link is good, the control unit determines to lengthen the SR cycle accordingly, and if the quality of the radio link is poor, the control unit determines to shorten the SR cycle shorter accordingly, on the basis of the information related to the quality of the radio link.

9. The network device of claim 6, wherein the SR receiving unit receives an additional SR indicating that the terminal device is turned on and notifies the control unit of the SR; and
the control unit, upon receiving the notification of the additional SR, transmits a control command a predetermined number of times through the control command transmitting unit to the terminal device, the control command instructing to report a current status of the terminal device.

10. A method of operating a terminal device used in a wireless communication system including at least one network device and at least one terminal device to perform a low-power consuming operation of the terminal device, comprising:
   (a) measuring a quality of a radio link through which the terminal device is connected to the network device;
   (b) determining to which of a normal condition, a power-off condition, and a radio link disconnected condition the measured quality of the radio link corresponds;
   (c) when the measured quality of the radio link corresponds to the status satisfying the normal condition, measuring the quality of the radio link, transmitting a status report (SR) with information related to the quality of the radio link to the network device according to current SR and discontinuous reception (DRX) cycles, receiving a control command including new SR and DRX cycles which correspond to the information related to the quality of the radio link from the network device, and changing the SR and DRX cycles on the basis of the received control command;
   (d) when the measured quality of the radio link corresponds to the status satisfying the power-off condition, measuring the quality of the radio link, transmitting an SR indicating that the terminal device is in the power-off state to the network device as long as the quality of the radio link is maintained at a level above a predetermined threshold value for a certain time period, and turning off the terminal device; and
   (e) when the measured quality of the radio link corresponds to the status satisfying the radio link disconnected condition, causing other neighboring terminal devices to transmit an SR of the terminal device having the disconnected state to the network device.

11. The method of claim 10, wherein in operation (a), the quality of the radio link is indicated by one of a reference signal received power (RSRP), a reference signal received quality (RSRQ), a received signal strength indicator (RSSI), a primary synchronization channel (PSC), a secondary synchronization channel (SSC), and a channel quality indicator (CQI), or by a combination of at least two thereof.

12. The method of claim 10, wherein operation (d) includes initiating a predetermined timer immediately after the terminal device is turned off, and turning on the terminal device when the timer has expired.

13. The method of claim 10, wherein the status satisfies the power-off condition when the quality of the radio link is maintained at a level above a predetermined threshold value for a certain time period.

14. A method of operating a network device used in a wireless communication system including at least one network device and at least one terminal device to perform a low-power consuming operation of the terminal device, comprising:
   (a) receiving a status report (SR) from the terminal device;
   (b) determining to which of an SR with information related to a quality of a radio link of the terminal device transmitting the SR, an SR indicating a current status by another terminal device in place of the terminal device, or an SR indicating that the terminal device is turned on the SR corresponds;
   (c) if the SR corresponds to an SR including the information related to a quality of a radio link of the terminal device transmitting the SR, determining a discontinuous reception (DRX) cycle and an SR cycle of the terminal device, and transmitting a control command including information related to the determined DRX and SR cycles to the terminal device, on the basis of the quality of the radio link; and
   (d) if the SR corresponds to an SR that another terminal device other than the terminal device informs a current status or an SR indicating that the terminal device is turned on, transmitting a control command that instructs the network device to report a current status to the terminal device a predetermined number of times.

15. The method of claim 14, wherein the quality of the radio link is indicated by one of a reference signal received power (RSRP), a reference signal received quality (RSRQ), a received signal strength indicator (RSSI), a primary synchronization channel (PSC), a secondary synchronization channel (SSC), and a channel quality indicator (CQI), or by a combination of at least two thereof.

16. The method of claim 14, wherein, in operation (c), if the quality of the radio link is good, the control unit determines to lengthen the DRX cycle accordingly, and if the quality of the radio link is poor, the control unit determines to shorten the DRX cycle accordingly, on the basis of the information related to the quality of the radio link.

17. The method of claim 14, wherein, in operation (c), if the quality of the radio link is good, the control unit determines to lengthen the SR cycle accordingly, and if the quality of the radio link is poor, the control unit determines to shorten the SR cycle accordingly, on the basis of the information related to the quality of the radio link.

* * * * *